U nited States Patent Office 3,546,312
Patented Dec. 8, 1970

3,546,312
OLEFIN CONVERSION AND CATALYST
THEREFOR
Louis F. Heckelsberg and Robert L. Banks, Bartlesville, Okla., assignors to Phillips Petroleum Company, a corporation of Delaware
No Drawing. Filed Apr. 3, 1967, Ser. No. 627,637
Int. Cl. C07c 3/62
U.S. Cl. 260—683                             6 Claims

ABSTRACT OF THE DISCLOSURE

Olefins are converted into other olefins having different numbers of carbon atoms per molecule by contact with a catalyst, active for disproportionating propylene into ethylene and butene, comprising silica associated with a promoting amount of an oxide of tellurium.

---

This invention relates to the conversion of olefin hydrocarbons and to a catalyst for such conversion. In one aspect this invention relates to a process and catalyst for the olefin reaction. In another aspect this invention relates to the conversion of an olefin according to the olefin reaction and to a catalyst for the olefin reaction.

The olefin reaction is defined as a process for the catalyst conversion over a catalyst of a feed comprising one or more ethylenically unsaturated compounds to produce a resulting product which contains at least ten percent by weight of product compounds, which product compounds can be visualized as resulting from at least one primary reaction, as defined below, or the combination of at least one primary reaction and at least one unsaturated bond isomerization reaction, and wherein the sum of the compounds contained in said resulting product consisting of hydrogen, saturated hydrocarbons, and compounds which can be visualized as formed by skeletal isomerization but which cannot be visualized as formed by one or more of the above-noted reactions, comprises less than twenty-five percent by weight of the total of said resulting product. Feed components and unsaturated bond isomers thereof are not included in the resulting product for the purpose of determining the above-noted percentages.

In the olefin reaction, as defined above, the primary reaction is a reaction which can be visualized as comprising the breaking of two existing unsaturated bonds between first and second carbon atoms and between third and fourth carbon atoms, respectively, and the formation of two new unsaturated bonds between said first and third and between said second and fourth carbon atoms. Said first and second carbon atoms and said third and fourth carbon atoms can be in the same or different molecules.

The olefin reaction according to this invention is illustrated by the following reactions:

(1) The disproportionation of an acyclic mono- or polyene having at least three carbon atoms into other acyclic mono- or polyenes of both higher and lower number of carbon atoms; for example, the disproportionation of propylene yields ethylene and butenes; the disproportionation of 1,5-hexadiene yields ethylene and 1,5,9-decatriene;

(2) The conversion of an acyclic mono- or polyene having three or more carbon atoms and a different acyclic mono- or polyene having three or more carbon atoms to produce different acyclic olefins; for example, the conversion of propylene and isobutylene yields ethylene and isopentene;

(3) The conversion of ethylene and an internal acyclic mono- or polyene having four or more carbon atoms to produce other olefins having a lower number of carbon atoms than that of the acyclic mono- or polyenes; for example, the conversion of ethylene and 4-methylpentene-2 yields 3-methylbutene-1 and propylene;

(4) The conversion of ethylene or an acyclic mono- or polyene having three or more carbon atoms and a cyclic mono- or cyclic polyene to produce an acyclic polyene having a higher number of carbon atoms than that of any of the starting materials; for example, the conversion of cyclohexene and 2-butene yields 2,8-decadiene; the conversion of 1,5-cyclooctadiene and ethylene yields 1,5,9-decatriene;

(5) The conversion of one or more cyclic mono- or cyclic polyenes to produce a cyclic polyene having a higher number of carbon atoms than any of the starting materials; for example, the conversion of cyclopentene yields 1,6-cyclodecadiene;

(6) The conversion of an acyclic polyene having at least seven carbon atoms and having at least five carbon atoms between any two double bonds to produce acyclic and cyclic mono- and polyenes having a lower number of carbon atoms than that of the feed; for example, the conversion of 1,7-octadiene yields cyclohexene and ethylene; or (7) The conversion of one or more acyclic polyenes having at least three carbon atoms between any two double bonds to produce acyclic and cyclic mono- and polyenes generally having both a higher and lower number of carbon atoms than that of the feed material; for example, the conversion of 1,4-pentadiene yields 1,4-cyclohexadiene and ethylene.

It is an object of this invention to provide a method for the conversion of olefin hydrocarbons and to a catalyst for such conversion. It is also an object of this invention to provide a catalyst and method for the olefin reaction. Another object of the invention is to provide a method and catalyst for the disproportionation of an olefin hydrocarbon. Other aspects, objects and advantages of my invention will be apparent to one skilled in the art upon reading the disclosure including the detailed description of the invention.

According to the process of this invention, olefin hydrocarbons are contacted with a catalyst comprising an oxide of tellurium which is in intimate association with a predominating amount of silica at a temperature of about 800 to 1200° F. and a pressure of about 100 to 1500 p.s.i.g. to produce products of the olefin reaction.

The catalyst composite contains from about 0.1 to about 30, preferably from about 1 to about 10, weight percent tellurium oxide (calculated as $TeO_3$ but can be present as any one or more oxides of tellurium) based on the weight of the total catalyst. The catalyst can be prepared by any conventional technique, such as, for example, impregnation, coprecipitation, dry mixing, and the like. The silica can be any conventional catalytic grade material and such materials as precipitated silica gel, microspheroidal silica, flame-hydrolized silica, aerogel silica, and the like, are suitable. Depending upon the catalyst preparation technique and on the type of olefin contacting process utilized, the finished catalyst can be in the form of a fine powder, granules, agglomerates, extrudates, and the like.

After the tellurium oxide, or tellurium compound convertible to the oxide on calcination is associated with the silica, the composite mixture is subjected to a heat treatment to increase the activity of the catalyst. This activating treatment is carried out in an oxidizing gas atmosphere, such as air, at a temperature in the range of from about 600° to about 1600° F., preferably from about 700° to about 1500° F. The time of activation can vary over a broad range depending upon the temperature employed. Shorter activation times are used with the higher temperatures and vice versa. Generally, the period of activation is at least 30 minutes and preferably from about 2 to 10 hours up to about 24 hours. The oxidizing gas with which the catalyst is contacted during activation should be substantially free of moisture. If desired the treatment with an oxygen-containing gas can be followed by a treatment with other gases such as nitrogen, hydrogen, carbon monoxide, carbon dioxide, and the like.

Olefins applicable for use in the process of the invention are acyclic mono and polyenes having at least 3 carbon atoms per molecule including cycloalkyl and aryl derivatives thereof; cyclic mono- and polyenes having at least 4 carbon atoms per molecule including alkyl and aryl derivatives thereof; mixtures of the above olefins; and mixtures of ethylene and the above olefins. Many useful reactions are accomplished with such acyclic olefins having 3–30 carbon atoms per molecule and with such cyclic olefins having 4–30 carbon atoms per molecule.

Some specific examples of acyclic olefins suitable for reactions of this invention include propylene, 1-butene, isobutene, 2-butene, 1,3-butadiene, 1-pentene, 2-pentene, isoprene, 1-hexene, 1,4-hexadiene, 2-heptene, 1-octene, 2,5-octadiene, 2,4,6-octatriene, 2 - nonene, 1 - dodecene, 2-tetradecene, 1-hexadecene, 5,6-dimethyl-2,4-octadiene, 2-methyl-1-butene, 2-methyl-2-butene, 1,3-dodecadiene, 1,3,6-dodecatriene, 3-methyl-1-butene, 1-phenylbutene-2, 7,7 - diethyl - 1,3,5-decatriene, 1,3,5,7,9-octadecapentaene, 1,3-eicosadiene, 4-octene, 3-eicosene and 3-heptene, and the like and mixtures thereof.

Some specific examples of cyclic olefins suitable for the reactions of this invention are cyclobutene, cyclopentene, cyclohexene, 3-methylcyclopentene, 4-ethylcyclohexene, 4-benzylcyclohexene, cyclooctene, 5-n-propylcyclooctene, cyclodecene, cyclododecene, 3,3,5,5 - tetramethylcyclononene, 3,4,5,6,7-pentaethylcylodecene, 1,5-cyclooctadiene, 1,5,9-cyclododecatriene, 1,4,7,10-cyclododecatetraene, 2-methyl-6-ethylcyclooctadiene-1,4, and the like, and mixtures thereof.

According to the process of the invention, the olefin and catalyst are contacted either batchwise or continuously using a stirred batch reactor, a fixed or mobile catalyst bed, a fluidized catalyst chamber, or other conventional contacting technique. The process is carried out either in the vapor phase or in the liquid phase at temperatures from about 800° to about 1200° F., and at pressures of about 100 to about 1500 p.s.i.g. In preferred operation, the contact with lower olefins is carried out continuously in the vapor phase at about 900 to about 1100° F. and at pressures of 300–600 p.s.i.g. In continuous operation, gaseous hourly space velocities in the range of about 100 to about 10,000 v./v./hr. are used. In batch reactions, the catalyst comprises from 1 to about 40 weight percent of the reaction mixture and reaction times of about 1 minute to about 20 hours are used.

If desired, paraffinic and cycloparaffinic hydrocarbons having up to about 12 carbon atoms per molecule can be employed as diluents for the reaction. Suitable diluents include propane, cyclohexane, methylcyclohexane, normal pentane, normal hexane, isooctane, dodecane, and the like, and mixtures thereof.

At the end of the reaction period, conventional methods are used to separate the hydrocarbon phase from the solid catalyst phase and to recover the products. Techniques such as fractionation, solvent extraction, adsorption, and the like can be employed for the separation of products. Unconverted feed material, diluents or products not in the desired molecular weight range can be recycled.

The invention can be further illustrated by the following examples.

EXAMPLE I

A catalyst was prepared by impregnating granules of a catalytic grade silica with an aqueous solution containing sufficient tellurium nitrate to yield a catalyst composite, after calcination, containing about 2–3 weight percent tellurium oxide calculated as $TeO_3$. A 5 ml. quantity of this impregnated and dried silica was charged into a stainless steel fixed bed reactor. This catalyst bed was activated in place by heating the bed at 1100° F. for 1 hour in a stream of dry flowing air. The bed was then flushed with nitrogen and cooled.

A feed gas consisting of 60 weight percent propylene and 40 weight percent propane was passed through the reactor at a pressure of 450 p.s.i.g. The temperature of the reactor and catalytic bed was maintained at 1000° F. The gaseous hourly space velocity of the total feed stream was 87 v./v./min.

After 70 minutes on stream, the effluent from the reactor was sampled and subjected to a gas-liquid chromatographic analysis. The results of this analysis are shown in weight percent, in the table below:

| | Percent |
|---|---|
| $H_2$ or $N_2$ [1] | 2.5 |
| Ethylene | 1.4 |
| Propane | 40.6 |
| Propylene | 47.6 |
| n-Butane | 0.2 |
| 1-butene | 0.6 |
| Trans-2-butene | 0.9 |
| Cis-2-butene | 0.8 |
| Isopentane | 0.1 |
| $C_5^+$ | 5.3 |

[1] Contains some air from the sampling technique used.

It is seen from the table above that the propylene was effectively disproportionated to both ethylene and butenes.

That which is claimed is:

1. In the process of converting an olefin in the olefin reaction wherein at least one olefin hydrocarbon is converted in the presence of a catalyst in a reaction zone under conditions of temperature and pressure suitable to produce products of the olefin reaction which, as defined herein, can be visualized as comprising the reaction between two first pairs of carbon atoms, the two carbon atoms of each first pair being connected by an olefinic double bond, to form two new pairs from the the carbon atoms of said first pairs, the two carbon atoms of each of said new pairs being connected by an olefinic double bond, the improvement comprising contacting, at a temperature in the range of about 800 to 1200° F. and a pressure in the range of about 100 to 1500 p.s.i.g., and acyclic mono- or polyene having from 3 to 30 carbon atoms per molecule, a cyclic mono- or polyene having from 4 to 20 arbon atoms per molecule, a mixture of said mono- or polyenes, or at least one of said mono- or polyenes and ethylene with a catalyst prepared by impregnating silica with a tellurium oxide or a compound convertible to a tellurium oxide to produce products of the olefin reaction.

2. The process of claim 1 wherein the temperature is in the range of about 900 to 1100° F. and the pressure is in the range of about 300 to 600 p.s.i.g.

3. The process of claim 1 wherein the catalyst contains about 0.1 to 30 weight percent of an oxide of tellurium based on the total catalyst weight.

4. The process of claim 1 wherein the space velocity in the reaction zone is in the range of about 100 to 10,000 volumes of gaseous hydrocarbon per volume of catalyst per hour.

5. The process of claim 1 wherein propylene is disproportionated to produce ethylene and butene.

6. The process of claim 1 wherein said olefin hydrocarbon is an acyclic monoene.

References Cited

UNITED STATES PATENTS

| 2,131,089 | 9/1938 | Beeck et al. | 260—680 |
| 2,370,512 | 2/1945 | Amos et al. | 260—680 |
| 2,514,497 | 7/1950 | Jones | 260—683 |

DELBERT E. GANTZ, Primary Examiner

C. E. SPRESSER, Assistant Examiner

U.S. Cl. X.R.

260—666, 668, 677, 680, 683.2, 683.15